Feb. 5, 1952   J. W. CRIST   2,584,187
ELECTRIC STOVE WITH PORTABLE GRILL
Filed March 28, 1949   2 SHEETS—SHEET 1
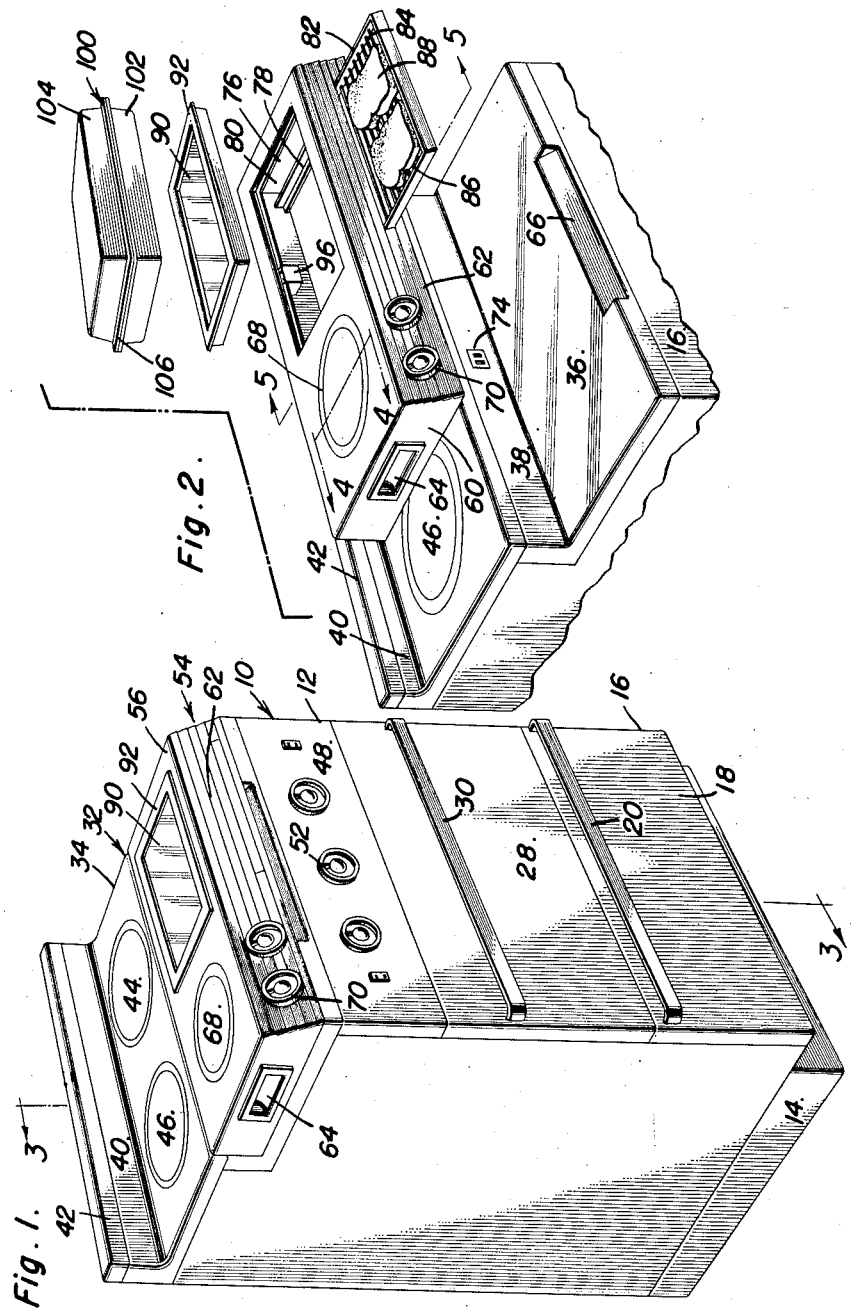
Jack W. Crist
INVENTOR.
BY *Clarence A. O'Brien*
*and Harvey B. Jacobson*
Attorneys

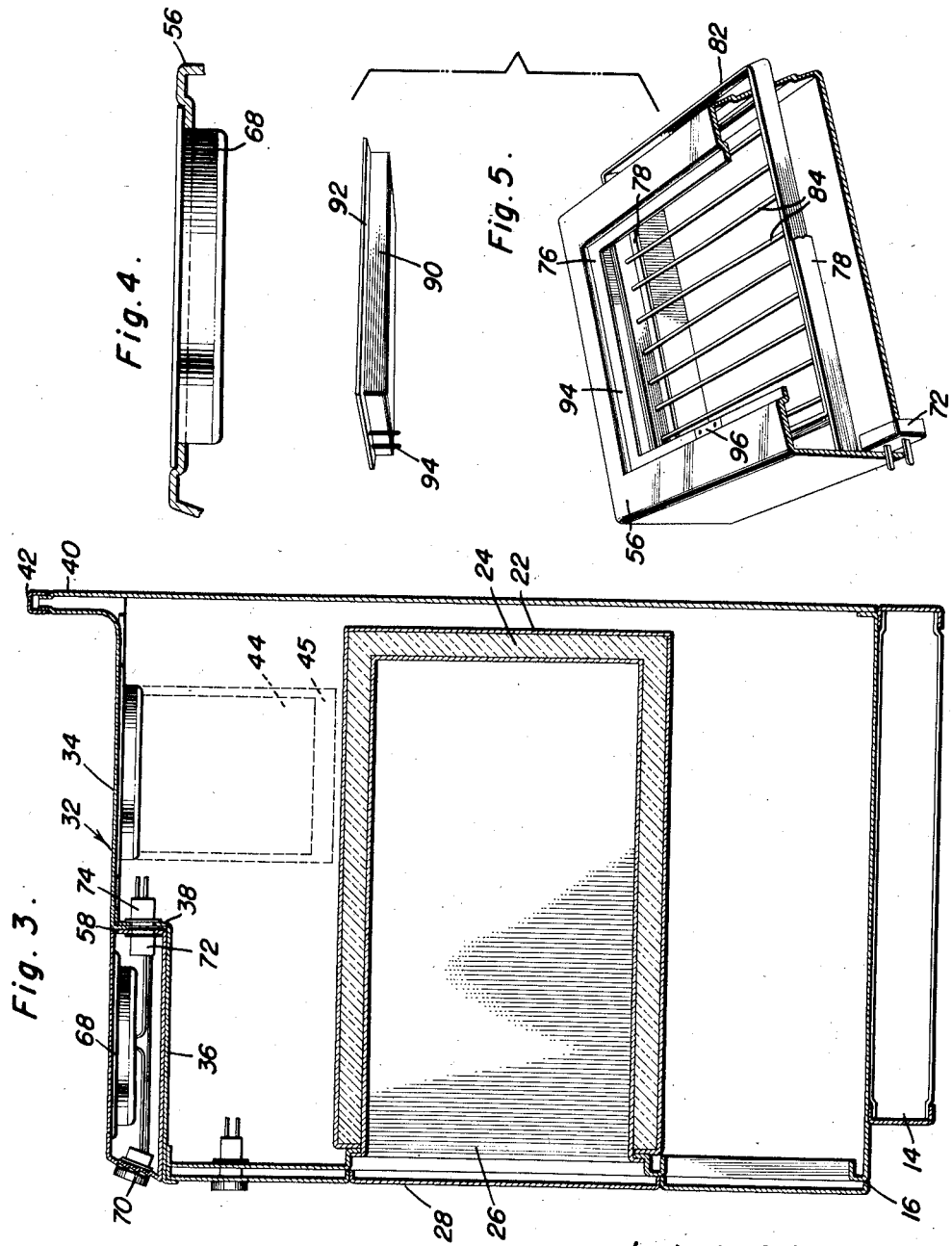

Patented Feb. 5, 1952

2,584,187

UNITED STATES PATENT OFFICE 2,584,187

ELECTRIC STOVE WITH PORTABLE GRILL

Jack W. Crist, Beachwood, N. J.

Application March 28, 1949, Serial No. 83,989

2 Claims. (Cl. 219—37)

This invention relates to novel and useful improvements in electric stoves and has for its primary object to form an electric stove with a detachable and portable grill; the grill, when attached to the stove, forming an operative adjunct and conjunctive part thereof, and, when detached, forming a complete cooking grill that may be positioned on any suitable support and used as a unit, complete in and of itself.

Another important object of this invention is to form a portable grill, which is easily positioned on an electric stove, as a working portion of the top of the stove, and is easily and conveniently detached from the stove and transported to any desired point, where it can be employed in the same capacity, as when associated with the stove.

Another important object of this invention is to combine an electric stove and electric grill in such a manner, that the grill forms an operative part of the stove and its identity as a grill is concealed, when attached to the stove, but which can be separated from the stove and used as a complete unit.

And yet another important object of this invention is to provide a novel electric stove, having a detachable top section, which may be utilized as a portable electric grill.

These and ancillary objects and structural features of merit are attained by this invention, a preferred embodiment of which is set forth in the following description and illustrated in the accompanying drawings, wherein:

Figure 1 is a view in perspective of a stove, constructed in accordance with the principles of this invention, and having associated therewith, a portable grill, constructed in accordance with the teachings of the instant invention;

Figure 2 is an exploded perspective view of the unassembled grill structure;

Figure 3 is a vertical sectional view taken substantially on line 3—3 of Figure 1;

Figure 4 is a transverse sectional view taken on line 4—4 of Figure 2, and,

Figure 5 is an exploded perspective view taken on line 5—5 of Figure 2, looking in the direction of the arrows.

Referring now to the drawings, the stove 10 includes a housing 12, mounted on a base platform 14, which is spaced inwardly from the front wall 16 of the housing to define a toe receiving space, whereby a person working at the stove may easily assume a convenient standing position in front of the stove.

A storage drawer 18 is slidably disposed in the lower portion of the housing and is provided with an elongated handle 20. An oven chamber 22 is formed above the storage drawer and is insulated as at 24 and provided with a slidably disposed oven 26 having a front 28 and handle 30.

A top 32 is formed on the housing and includes a rear section 34 and a front section 36 disposed in a horizontal plane below the rear section and separated therefrom by a vertical wall 38. A vertical back splash section 40 extends upwardly from the rear edge of the rear section and a cap 42 is mounted on the upper edge thereof to support, if desired, a hood and exhaust fan, not shown. Deep wells 45 are formed in spaced parallel fashion in the rear section of the top and support in a conventional manner within the recesses deep well cooker units 44, which depend into the wells. The same are heated in a conventional manner and covered grills or the like 46 could be substituted for the cooker units.

A control panel 48, having knobs 52 positioned thereon, is formed at the front of the housing adjacent the front top section, the knobs being conventionally associated with electrically energized heating coils or grids for the oven and cooker units.

A portable grill 54, is adapted for disposition on the front top section so as to abut against the wall 38 and is formed so that the side edges and top will be flush with the side walls of the housing and upper face of the rear top section to define a prolongation of the rear section. The portable grill includes a rectangular casing 56 formed with a vertical back wall 58 and side walls 60 and upwardly and inwardly slanting front wall 62. The vertical back wall 58 is adapted to abut against the vertical wall 38. Handle openings 64 are formed in the opposing side walls to enable the casing to be moved outwardly and lifted from the upper face of the front section of the top. However, in the event that the sides are obscured by adjoining cabinets or the like, a beveled recess 66 is formed on the forward edge of the front top section so that a finger opening is formed to enable the grill to be lifted from the top. An electric grid 68 is provided in the casing and is controlled by a knob 70 disposed on the front wall or panel 62. A male electrical connector or plug 72 is wired with the grid and control knob 70 and is adapted for attachment in a female socket 74 provided in the rear wall 38.

An opening 76 is formed adjacent the grid 68 and a pair of opposing parallel guide rails 78 are formed on the opposing side walls 80 thereof. The guide rails slidably support a rectangular frame 82 having a series of rods 84 disposed in parallelism between the opposing side walls 86 thereof. It is to be noted that the frame, provided with the spaced wires, constitutes a toaster, upon which slices of bread 88 may be positioned, so that when the frame is moved inwardly on the guide rail 78 the same will be positioned between heating elements for the purpose of toasting the bread.

A rectangular plate 90 having a peripheral rim or flange 92 is provided and is adapted to seat within the opening, the rim resting on an inwardly directed flange 94 formed on the side and end walls of the opening. The plate or grill is provided with a heating element, associated with a plug 95, the latter being adapted for insertion within a socket 96 formed on the flange 94, as seen in Figure 2. A waffle iron unit 100, comprising a pair of irons 102 and 104 of equal dimension, is provided, the iron or grid 102 constituting the bottom section of the unit, with the grid 104 disposed in an inverted position on the bottom section and constituting the upper pan or section of the closed cooker. It is to be noted that both of the grids are provided with lateral rims or flanges 106, which are juxtapositioned, when the two grids are placed together. The flanges 106 are adapted to seat on the flange 94, so that the waffle unit may be positioned within the recess and connected to the socket 96 by a conventional plug carried thereby.

It is to be particularly noted that the casing can be easily removed from the top of the stove and can be transported to any desired point, where the same can be employed as a complete working unit by merely inserting the plug 72 in a conventional electric socket. When the grill is used, in association with the stove, it forms an operative adjunct thereof and the waffle unit, can be employed when the grill is removed or the grill or iron can be used in conjunction with the cooker units 44 and 46 permanently associated with the range or stove.

However, while one embodiment of this invention has been shown, it is to be understood that certain other embodiments can be carried out, as coming within the spirit and scope of the appended claims.

Having described the invention, what is claimed as new is:

1. In combination with an electric range having a cooking top and a forwardly positioned flat top disposed in a horizontal plane below the cooking top, a portable grill detachably disposed on the flat top with the top of said grill disposed in the same horizontal plane as the cooking top, hand grip means for seating and removing said grill on the flat top of the range, means electrically connecting the grill with the electrical system of the range, cooking components carried by the grill, means electrically connecting said components to said last mentioned means, said grill being provided with a vertical opening, guide rails in said opening, and a toaster including an open frame having parallel rods secured therein and slidably disposed on said rails.

2. In combination with an electric range having a top wall, said top wall being divided into a rear section and a front section disposed in a horizontal plane below the plane in which the rear section lies, a portable grill adapted for detachable disposition on the front section with the rear wall of the grill in abutting engagement of the front wall of the rear section and the sides of the grill flush with the sides of the rear section, heating elements in said grill, means for connecting the heating elements with the electrical system of the range, said heating elements being detachable from the grill.

JACK W. CRIST.

REFERENCES CITED

The following references are of record in the file of this patent:

UNITED STATES PATENTS

| Number | Name | Date |
| --- | --- | --- |
| 1,154,954 | Williams | Sept. 28, 1915 |
| 1,431,953 | Henoch | Oct. 17, 1922 |
| 1,609,317 | Smith | Dec. 7, 1926 |
| 1,669,802 | Armstrong | May 15, 1928 |
| 1,717,269 | Shoryer | June 11, 1929 |
| 1,948,402 | Teller et al. | Feb. 20, 1934 |
| 2,285,127 | Rerucha | June 2, 1942 |
| 2,321,167 | Taft | June 8, 1943 |
| 2,438,470 | Wilson | Mar. 23, 1948 |

FOREIGN PATENTS

| Number | Country | Date |
| --- | --- | --- |
| 28,838 of 1930 | Australia | Sept. 4, 1931 |
| 878,092 | France | Jan. 11, 1943 |